US009113332B2

(12) United States Patent
Bournelle et al.

(10) Patent No.: US 9,113,332 B2
(45) Date of Patent: Aug. 18, 2015

(54) METHOD AND DEVICE FOR MANAGING AUTHENTICATION OF A USER

(75) Inventors: Julien Bournelle, Paris (FR); Lionel Morand, Malakoff (FR)

(73) Assignee: FRANCE TELECOM, Paris (FR)

( * ) Notice: Subject to any disclaimer, the term of this patent is extended or adjusted under 35 U.S.C. 154(b) by 110 days.

(21) Appl. No.: 13/262,171

(22) PCT Filed: Mar. 26, 2010

(86) PCT No.: PCT/FR2010/050563
§ 371 (c)(1),
(2), (4) Date: Dec. 19, 2011

(87) PCT Pub. No.: WO2010/112741
PCT Pub. Date: Oct. 7, 2010

(65) Prior Publication Data
US 2012/0096529 A1     Apr. 19, 2012

(30) Foreign Application Priority Data

Mar. 31, 2009    (FR) ...................................... 09 52064

(51) Int. Cl.
*G06F 21/00*    (2013.01)
*H04W 12/06*    (2009.01)
*H04W 12/08*    (2009.01)

(52) U.S. Cl.
CPC .............. *H04W 12/06* (2013.01); *H04W 12/08* (2013.01)

(58) Field of Classification Search
CPC ..................................................... H04W 12/06
USPC ....................................................... 726/7, 10
See application file for complete search history.

(56) References Cited

U.S. PATENT DOCUMENTS

| | | | |
|---|---|---|---|
| 7,328,268 B1* | 2/2008 | Foltak et al. ................... | 709/228 |
| 2002/0028671 A1* | 3/2002 | I'Anson et al. ............... | 455/414 |
| 2003/0004834 A1* | 1/2003 | Yamazaki ........................ | 705/26 |
| 2003/0046541 A1* | 3/2003 | Gerdes et al. .................. | 713/168 |
| 2004/0098612 A1* | 5/2004 | Lee et al. ........................ | 713/200 |
| 2005/0289643 A1* | 12/2005 | Sato et al. .......................... | 726/4 |
| 2006/0077924 A1* | 4/2006 | Rune ............................. | 370/328 |
| 2006/0104234 A1* | 5/2006 | Zhang ............................ | 370/328 |
| 2006/0128362 A1* | 6/2006 | Bae et al. ....................... | 455/411 |
| 2006/0218625 A1* | 9/2006 | Pearson et al. ..................... | 726/4 |
| 2007/0004393 A1* | 1/2007 | Forsberg et al. .............. | 455/420 |
| 2007/0220598 A1* | 9/2007 | Salowey et al. ................. | 726/10 |

(Continued)

OTHER PUBLICATIONS

IEEE document standard 802.1X-2001 "Port-Based network Access Control" 2004.

(Continued)

*Primary Examiner* — Morshed Mehedi
(74) *Attorney, Agent, or Firm* — David D. Brush; Westman, Champlin & Koehler, P.A.

(57) ABSTRACT

A method and apparatus are provided for managing authentication of a user of a telecommunications network of an operator. The method includes the following steps: on receipt of a request for access to a service provided by the operator of this network by the user, issuing a request for identification of an authentication server destined for an authentication location server, the request including at least one identifier of the user; and on receipt of a response comprising an identifier of an authentication server associated with the identifier of the user, issuing a request for authentication of the user at the server identified for the requested service.

8 Claims, 8 Drawing Sheets

(56) References Cited

U.S. PATENT DOCUMENTS

| | | | |
|---|---|---|---|
| 2008/0168537 A1* | 7/2008 | Nakhjiri | 726/4 |
| 2009/0064291 A1* | 3/2009 | Wahl | 726/5 |
| 2009/0073937 A1* | 3/2009 | Xia et al. | 370/331 |
| 2009/0089866 A1* | 4/2009 | Yato et al. | 726/6 |
| 2009/0204690 A1* | 8/2009 | Bauer et al. | 709/219 |
| 2009/0328178 A1* | 12/2009 | McDaniel et al. | 726/9 |

OTHER PUBLICATIONS

Aboba Microsoft M Beadles Endforce J Arkko Ericsson P Eronen Nokia B: "The Network Access Identifier; rfc4282.txt" IETF Standard, Internet Engineering Tesk Force, IETF, Ch, Dec. 1, 2005, XP015043211.

3GPP: "3rd Generation Partnership Project; Technical Specification Group Services and System Aspects; 3GPP System Architecture Evolution (SAE); Security Aspects of non-3GPP accesses; (Release 8)" 3GPP TS 33.402 V8.2.1, [Online] vol. 33102, No. v8.2.1, Dec. 1, 2008 pp. 1-41, XP002545562 URL:http://www.3gpp.org/ftp/specs/archive/33_series/33.402/334012-821/zip.

International Search Report and Written Opinion dated Jun. 24, 2010 for corresponding International Application No. PCT/FR2010/050563, filed Mar. 26, 2010.

* cited by examiner

METHOD AND DEVICE FOR MANAGING AUTHENTICATION OF A USER

CROSS-REFERENCE TO RELATED APPLICATIONS

This Application is a Section 371 National Stage Application of International Application No. PCT/FR2010/050563, filed Mar. 26, 2010 and published as WO 2010/112741 on Oct. 7, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of telecommunications networks, and more particularly of the authentication of a user who desires to access a service provided by an operator of such a network.

BACKGROUND OF THE DISCLOSURE

A user of a telecommunications network accesses this network by way of an access network. Several types of access are available. These include fixed accesses, based for example on x-DSL (Digital Subscriber Line) technology, and mobile accesses based on UMTS (Universal Mobile Telecommunication System), WIFI or WImax technologies.

Certain access networks of IP (Internet Protocol) packet type possess so-called AAA (Authentication, Authorization, Accounting) authentication infrastructures, which carry out the authentication of the users, manage the authorization of access to the requested services and perform the accounting for billing the user for the service.

In a conventional manner, the AAA architecture relies on the following principles:

The user's terminal hooks up to the access network via a network access point.

In the access network, a network access server is responsible for controlling access to the IP transport core network, which itself provides services for accessing other IP networks such as the Internet or else a private IP network, such as a companies network for example.

In this context, the role of the network access server is to authenticate and to authorize the terminal to access the IP core network. To carry out these functions, this access server dispatches, on receipt of a request issued by the terminal, a request for access to an authentication server in charge of verifying the authentication parameters provided by the terminal. Once authentication has been successful, access to the network services is authorized as a function of the rights of access associated with the user of the terminal.

Today, the AAA architecture is also implemented for the authentication of a user already connected to an operator's IP transport core network, but who desires to access a service provided by an application system of this network. For example, to access an IP mobility service which will allow him to change type of access in the course of an application session, the user must authenticate himself a second time with the AAA architecture.

The authentication and authorization data are grouped together in what is called a user data profile. This profile is hosted either in the authentication server receiving the access request, or in another authentication server. In this case, the access request is transmitted to the latter and it is this server which will ensure authentication of the terminal.

Once the authentication and authorization procedures have been carried out, the network access server is in charge of generating accounting messages containing the information related to the events associated with the connection in progress (start of session, end of session, volume of data transmitted, etc.). These messages are dispatched to a specialized server which will be in charge of generating billing invoices as a function of the accounting information received. This server may be co-located with the authentication server or be an independent server.

The servers carrying out the Authentication, Authorization and/or Accounting functions are generically called "AAA servers". The network access servers which are the "clients" of these AAA servers are called "AAA clients".

The so-called AAA protocols are the protocols used on the interfaces between AAA client and AAA server or between AAA servers. Specified at the IETF, the one most used at present is the RADIUS protocol (IETF RFC 2865). Since 2002, the IETF has defined a new protocol called Diameter (IETF RFC 3588), the successor to RADIUS, making it possible to respond to the new functional requirements and constraints prompted by the emergence of new types of access networks and of new network services such as IP mobility management for example.

The AAA architecture will now be described in conjunction with FIG. 1.

A user terminal UE 10 (User Equipment), which desires to access an IP data network 3 such as the Internet, is considered. It connects initially to the operator's telecommunications network 1 through an access management server (Network Access Server) NAS1 110 of an access network 20. At the level of the access network, one also speaks of access point (AP). This may be fixed access of x-DSL type or mobile access of WIFI type, for example. This connection requires a first authentication which is requested of an authentication server AAA1 210 of the network 1 by the access management server NAS1 110. The authentication server AAA1 210 recovers a profile of the user from a database DB 400 which may be local or centralized.

Once this first authentication has been successful, the terminal issues a request for access to the IP network (or service) 3 through an access management server for this service or NAS2 120. For this purpose, it uses a protocol making it possible to establish an IP connection.

Several protocols may be used as a function of the type of access network and of the type of network to which access is desired. Cited by way of example are the PPP protocol (Point To Point Protocol, described in the IETF document RFC 1661) for fixed accesses to the Internet with the aid of modem of RTC type, the IEEE protocol 802.1X (described in the IEEE document standard 802.1X-2001 "Port-Based network Access Control") for Wifi accesses or else the IKEv2 protocol (Internet Key Exchange V2, RFC 4306) for setting up IPsec security association for accesses of VPN (Virtual Private Network) or I-WLAN type.

The server for managing access to the service NAS2 issues a request for authentication of the user through an authentication server AAA2 120. It is understood that this authentication server may be different from that which carried out the first authentication of the user.

The AAA architecture in fact affords the possibility of distributing over a given territory several network access servers charged with controlling access to the resources. When several AAA servers are deployed in the network, each server can have its own user database or all the servers are connected to a centralized database. The centralized architecture is the one found in particular in mobile networks. The use of a centralized base allows the user to be able to move to any network access point while being certain of being able to be authenticated and authorized to access its services.

Figure 1:
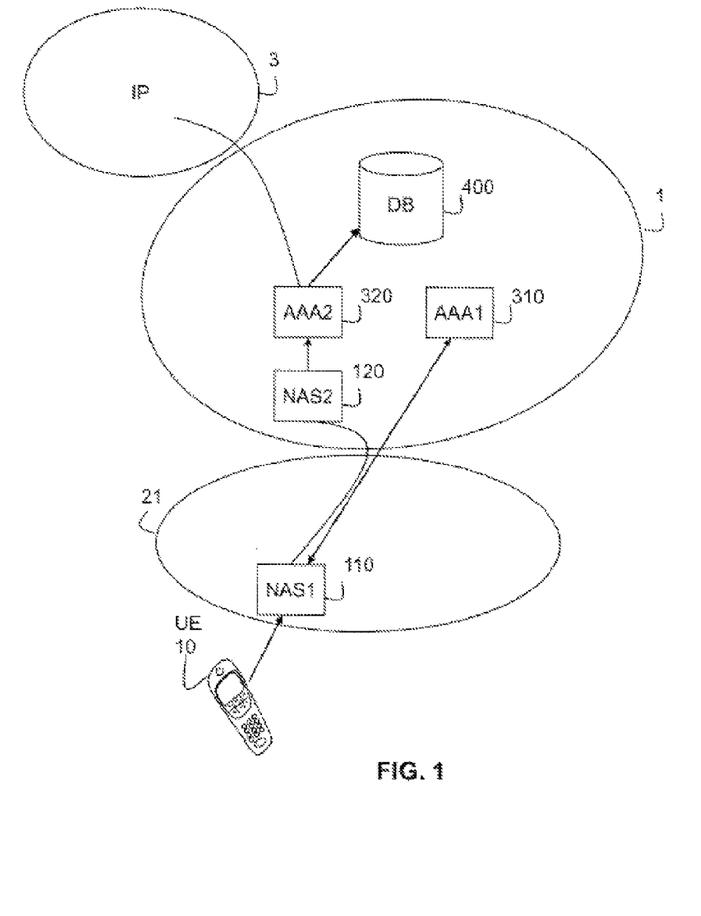
FIG. 1 presents in a schematic manner a first exemplary implementation of an AAA architecture in a telecommunications network of an operator according to the prior art.

When, as in the example of FIG. 1, the user desires to access a service which requires two successive authentications, it is desirable to exploit the first authentication so as to simplify the second. In this regard, there exist moreover mechanisms of reauthentication at the local level. These same mechanisms could be reused or adapted within the framework of successive authentications by one and the same operator. For example, the ERP protocol (EAP Extension for EAP Re-authentication Protocol, defined at the IETF in RFC 5296) makes it possible to reuse the cryptographic material arising from a first authentication carried out with the EAP protocol (Extensible Authentication Protocol, defined at the IETF in RFC 3748). This makes it possible to reduce the number of signaling messages exchanged in the network as well as the calculation times on the equipment concerned. This being particularly true in the case where the terminal is in a visited network and the cryptographic material is held in the local network.

However, such mechanisms risk being inoperative when the user, already authenticated a first time by the network, does not address himself to the same server NAS1 for managing access to the network during a second authentication. Such a situation arises in particular in the previous example when access to the access network and access to the Internet network are managed by different access management servers. It also arises when the user is roaming and has changed access network since the first authentication in the access network. Such a case will now be presented in conjunction with FIG. 2.

Figure 2:
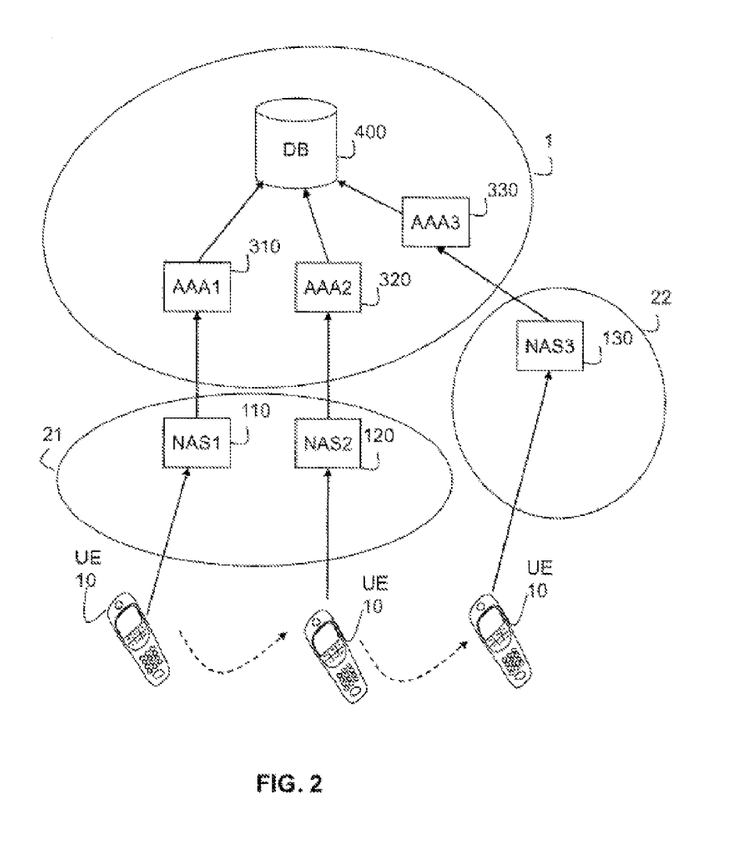
FIG. 2 presents in a schematic manner a second exemplary implementation of an AAA architecture in a telecommunications network of an operator according to the prior art.

The terminal UE 10 has connected to the access network 21, for example a mobile access network of Wifi type. An access management server NAS1 and an authentication server AAA1 have taken charge of the appropriate connection and authentication procedures. It is assumed that the user moves and changes point of access to the access network 21. He must reconnect to the access network in the course of a so-called handover procedure (transfer), through a second access management server for the network NAS2 120.

The IETF document RFC 4282 by Aboba et al, entitled "The Network Access Identifier", is considered, said document teaching the use of an access network identifier (Network Access Identifier or NAI) submitted by the user to the access management server NAS1, NAS2 during his requests for access to a service. This identifier indicates the domain of the operator with which the user has taken out a subscription. On receipt of this identifier, the server for managing access to the service makes a DNS request to recover the address of the AAA server or servers corresponding to this domain. A problem arises when, as in the example of FIG. 2, several AAA servers have been deployed for this domain, this possibly occurring for load sharing and security reasons.

Indeed, in this case, knowledge of the identifier NAI does not allow the access management server to identify which local AAA server from among the AAA servers deployed in the domain is in charge of this user.

Figure 3:
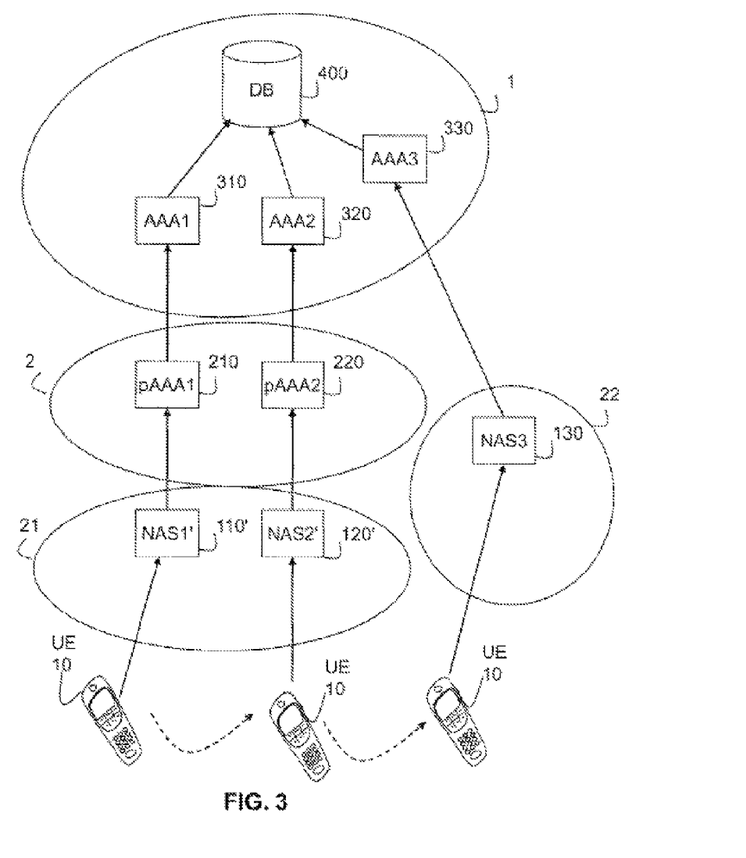
FIG. 3 presents in a schematic manner a third exemplary implementation of an AAA architecture in a telecommunications network in the case where the terminal accesses a service of a third party operator according to the prior art.

In conjunction with FIG. 3, the case is now considered where the user is additionally in a "roaming" situation, that is to say he accesses a service to which he has subscribed through his operator via the network 2 of a third party operator. An access management server NAS1' and a proxy authentication server pAAA1 of the visited network 2 take charge of the appropriate connection and authentication procedures. The server for managing access to the local service NAS1' makes, with this aim, a DNS request to recover the address of a local proxy AAA server pAAA1. The server pAAA1 thereafter contacts an AAA server of the network 1, termed the attachment or "home" network of the user, which undertakes the authentication. The authentication server AAA1 of the network 1 has previously recovered a profile of the user from the database DB 400 of the network 1.

It is thereafter assumed that, as in the previous example, the user moves and changes point of access to the access network 21'. He must reconnect to the network for access to the visited network 2 in the course of a so-called handover procedure (transfer), through a second server NAS2' for managing access to the network. This second management server NAS2' contacts a proxy authentication server pAAA2 by default, which addresses itself in its turn to an AAA server AAA2 of the home network 1.

In this regard, the 3GPP standard TS 23.402 describes a solution for the server AAA2 to recover an identifier of the server AAA1 which has undertaken a first authentication of the user through the database DB 400, in the particular case where the latter was implemented in an HSS (Home Subscriber Service) server. The server AAA2 can then behave in two ways:

either it behaves as proxy and transmits the request for authentication of the roaming user to the server AAA1 of the network 1;

or it dispatches to the proxy AAA server pAAA2 of the visited domain 2 the identity of the server AAA1 so that it recovers the user's profile from it.

It is understood that none of these options offers the management server NAS2' the possibility of recovering the identity of the proxy server pAAA1 which had been used during the first authentication. Thus, if the proxy server pAAA1 possessed additional cryptographic material allowing fast reauthentication of the user's terminal, it cannot be utilized.

It should be noted that the standard 33.402 describes this solution with the aim of avoiding a new transmission of the user's profile to another AAA server AAA2, not with that of optimizing the process for reauthenticating the user in a roaming situation.

SUMMARY

An exemplary embodiment of the invention relates to a method for managing an authentication of a user of a telecommunications network of an operator, characterized in that it comprises the following steps:

on receipt of a request for access to a service provided by the operator of this network by said user, issuing of a request for identification of an authentication server destined for an authentication location server, said request comprising at least one identifier of said user (user-ID); and on receipt of a response comprising an identifier of an authentication server (AAA_ID) associated with said identifier of the user, issuing of a request for authentication of the user at the server identified for the requested service.

Such a method allows the access management server for the service requested to know whether the requesting user has already been authenticated in the operator's network and, if appropriate, to obtain the identifier of the authentication server which performed this authentication. It is understood that in the case where the server for managing access to the service belongs to a visited network, it obtains the identifier of the AAA proxy server locally in charge of this user.

An embodiment of the invention thus makes it possible to avoid resorting to complete authentication when authentication material used during a previous authentication is available in a network authentication server of the operator, in particular in a proxy AAA server of a visited network.

According to one aspect of an embodiment of the invention, on receipt of a response not comprising any authentication server identifier associated with the identifier of the user, the method implements a step of issuing of a request for authentication at a predetermined authentication server.

Thus, when no association has been stored, the server for managing access to the requested service addresses itself to a predefined authentication server.

An embodiment of the invention also relates to a device for managing an authentication of a user of a telecommunications network of an operator, characterized in that it comprises means for implementing the method, which has just been described, for managing authentication according to an embodiment of the invention.

An embodiment of the invention also relates to a server for managing access to a service provided by an operator of a telecommunications network, characterized in that it comprises a device for managing authentication of a user according to an embodiment of the invention.

An embodiment of the invention also relates to a method for storing an authentication location for a user of a telecommunications network, characterized in that it comprises, subsequent to a successful authentication of said user by an authentication server, a step of storing an association between at least one identifier of said user and an identifier of said authentication server. In the case of a "roaming" situation, the storage step relates to an association between at least one identifier of said user and an identifier of said proxy AAA server of the visited network.

In the case of a first successful authentication, it consists in recording an association between an identifier of the user and an identifier of the authentication server predefined in the database, with a view to a next authentication of the same user. In the case of a roaming situation, the association relates to an identifier of the user and the local AAA server having played the role of proxy and having received the cryptographic material relating to the user.

It will be noted that the AAA server, subsequent to a successful authentication, is able to manage a state of the AAA session established for the user's terminal. Consequently, it avails itself locally of information allowing it to establish whether this is a first authentication or a reauthentication of this terminal. It therefore deduces therefrom the circumstances in which the storage method according to an embodiment of the invention must be implemented.

An embodiment of the invention also relates to a device for storing an authentication location for a user of a telecommunications network, characterized in that it comprises means for the implementation of the storage method, which has just been described, according to an embodiment of the invention.

An embodiment of the invention relates furthermore to an authentication server for a user who requests access to a service provided by an operator of a telecommunications network, characterized in that it comprises a device for storing an authentication location according to an embodiment of the invention.

An embodiment of the invention relates furthermore to an authentication location server in a telecommunications network, characterized in that it comprises means for storing an association between an identifier of a user and an identifier of an authentication server and means for obtaining the association stored in response to a request received from a server for managing access to a service provided by the network.

An embodiment of the invention relates to a telecommunications network of an operator, comprising at least one first server for managing access to at least one service and at least one second server for managing access to at least one service of an operator and at least two authentication servers able to authenticate a user who requests access to said at least one service, characterized in that it comprises an authentication location server according to an embodiment of the invention and in that the first access management server and the second access management server comprise an authentication management device according to an embodiment of the invention.

In a particular embodiment, the various steps of the method for managing access to a service are determined by instructions of computer programs.

Consequently, an embodiment of the invention is also aimed at a computer program on an information support, this program being able to be implemented in a routing, reception or transmission device or more generally in a computer, this program comprising instructions suited to the implementation of the steps of a method for managing authentication of a user such as described hereinabove.

In a particular embodiment, the various steps of the method for storing an authentication location for a user are determined by instructions of computer programs.

Consequently, an embodiment of the invention is also aimed at a computer program on an information support, this program being able to be implemented in a routing, reception or transmission device or more generally in a computer, this program comprising instructions suited to the implementation of the steps of a method for managing authentication of a user such as described hereinabove.

These programs can use any programming language, and be in the form of source code, object code, or of code intermediate between source code and object code, such as in a partially compiled form, or in any other desirable form.

The An embodiment of the invention is also aimed at an information support readable by a computer, and comprising instructions of a computer program such as mentioned hereinabove.

The information support may be any entity or device capable of storing the program. For example, the support can comprise a storage means, such as a ROM, for example a CD ROM or a microelectronic circuit ROM, or else a magnetic recording means, for example a diskette (floppy disk) or a hard disk.

Moreover, the information support may be a transmissible support such as an electrical or optical signal, which may be routed via an electrical or optical cable, by radio or by other means. The program according to an embodiment of the invention may be in particular downloaded from a network of Internet type.

Alternatively, the information support may be an integrated circuit into which the program is incorporated, the circuit being adapted for executing or for being used in the execution of the methods in question.

BRIEF DESCRIPTION OF THE DRAWINGS

Other advantages and characteristics will be more clearly apparent on reading the following description of a particular embodiment of the invention, given by way of simple illustrative and nonlimiting example, and the appended drawings, from among which.

DETAILED DESCRIPTION OF ILLUSTRATIVE EMBODIMENTS

By way of reminder, the general principle of an embodiment of the invention relies on:
- the storage of an association between the identifier of a user and the identifier of an authentication server subsequent to the successful authentication of this user in a telecommunications network;
- the obtaining of this association on receipt of a new request for access to a service of the network of the operator by this user.

Figure 4:
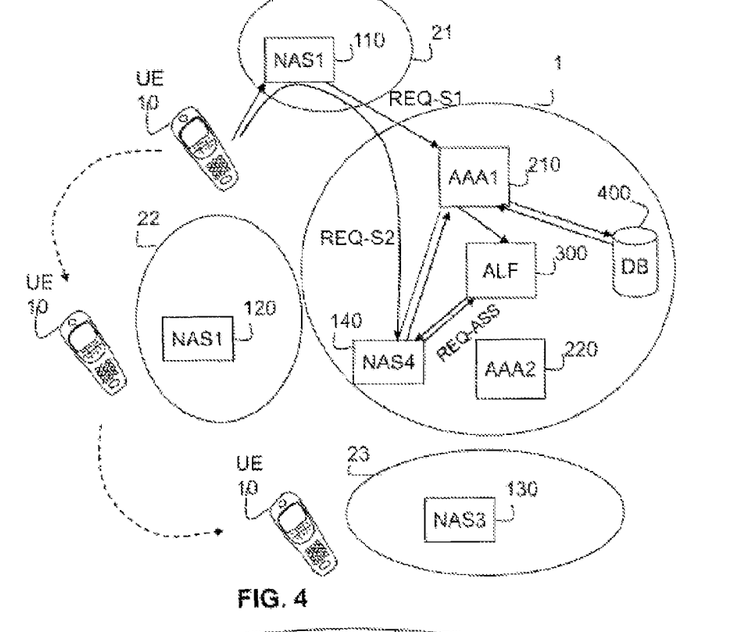
FIG. 4 presents in a schematic manner a telecommunications network of an operator at the crux of an embodiment of the invention.

In the subsequent description, a telecommunications network 1 of an operator such as that of FIG. 4 is considered. It is accessible to a terminal UE 10 of a user who has previously taken out a subscription with this operator. According to the nature of his subscription, the user can access the telecommunications network 1 and the services provided by the operator on this network via a plurality of access networks 21, 22 which may be based on any type of access technology, fixed or mobile.

The telecommunications network 1 hosts an AAA authentication architecture such as that previously described in the prior art. Such an architecture comprises in particular several servers for managing access to a service NAS1 110, NAS2 120, each in charge of access to a different network/service. In the example of FIG. 3, the server NAS1 is in charge of managing access to the network 1 by way of the access network 21, the server NAS2 120 in charge of access to the network (or service) 1 by way of the access network 22, the server NAS3 in charge of the access network (or service) 23 and the server NAS4 140 in charge of access to the IP network (or service) 3. The AAA architecture also comprises a plurality of authentication servers AAA1, AAA2 distributed within the telecommunications network 1.

According to an embodiment of the invention, the AAA architecture of the telecommunications network 1 furthermore comprises an authentication location server ALF 300. It comprises means for receiving an association ASS(user-ID, AAA-ID) originating from a server for managing access to a service subsequent to the successful authentication of a user identifiable by a user identifier user-ID by an authentication server identifiable by an identifier AAA-ID. It also comprises means for storing the association received in a database. It finally comprises means for interrogating the database with the help of a user identifier, which are able to obtain an association comprising said identifier, if one exists in the database.

Figure 5:
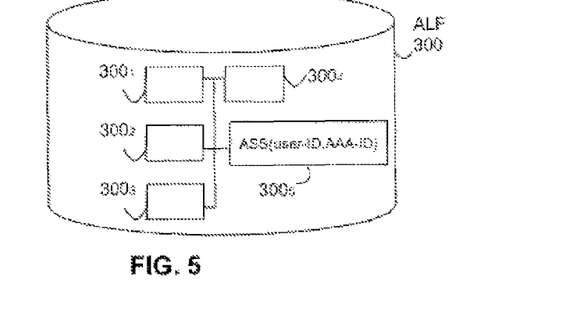
FIG. 5 presents in a schematic manner a telecommunications network of an operator at the crux of an embodiment of the invention, in the case where the user is in a "roaming" situation.

In the example described in conjunction with FIG. 5, the location server ALF 300 comprises the material elements that are routinely found in a conventional computer or a specialized router, namely a processor $300_1$, a random-access memory of RAM type $300_2$, a read-only memory of ROM type $300_3$ and means $300_4$ of telecommunication with the network 1.

In accordance with an embodiment of the invention, the location server ALF 300 comprises a memory $300_5$ comprising a database in which are stored the associations between an identifier user-ID of the user UE 10 and an identifier of the AAA-ID authentication server AAA1 that has carried out a successful authentication of the user. It will be noted that this memory can equally well be external to the device 300 provided that it can access it.

Figure 6:
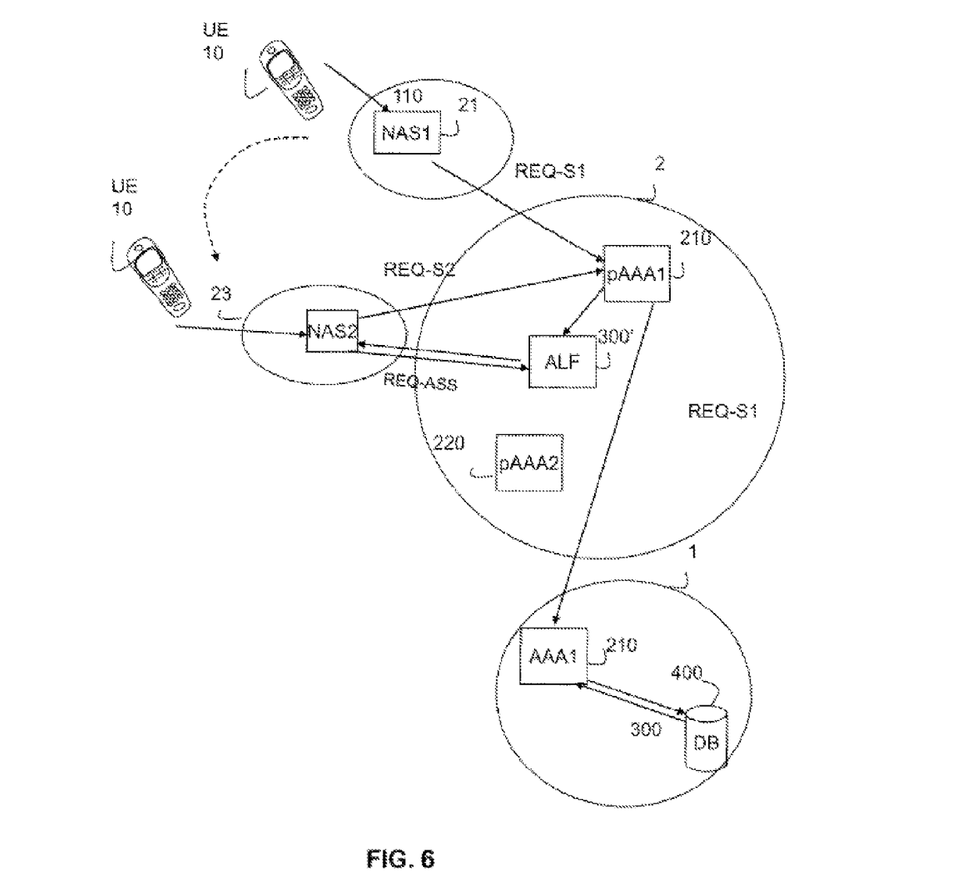
FIG. 6 presents in a schematic manner the structure of a location server for authenticating a user according to an embodiment of the invention.

A telecommunications network 1 of an operator with which the user terminal UE 10 has taken out a subscription to access services is considered in conjunction with FIG. 6. It is assumed that this operator has signed so-called "roaming" agreements with a third party operator, which allow in particular the user terminal UE10 to access the network 1 and the services that it has subscribed via a network 2 of the third party operator, termed the visited network.

According to an embodiment of the invention, a location server ALF 300' is then implemented in the network 2 so as to respond to the location requests issued by the access management servers NAS1', NAS2' of the network 2. In response to such requests, it is able to provide, when it exists, an association between an identifier of the user in the visited network 2 and an identifier of an AAA proxy server of the network 2 that has undertaken a first authentication of this terminal UE10.

Figure 7:
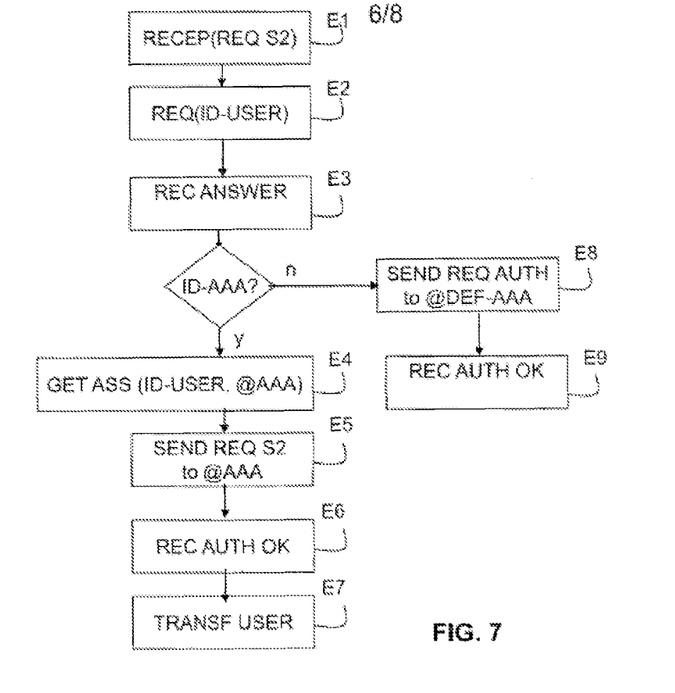
FIG. 7 illustrates in a schematic manner the steps of the method for managing authentication of a user according to an embodiment of the invention.

An embodiment of the invention also relates to a method for managing authentication of a user which will now be described in conjunction with FIG. 7. Such a method comprises a step E1 of receiving a request for access REQ-S2 to a service S2, issued by a user UE 10 of the telecommunications network 1. This is for example the service for access to the Internet network 3. On receipt of this request, a step E2 of interrogating the location server LRF 300 is implemented. Such an interrogation consists in sending the location server LRF 300 a request comprising at least one identifier user-ID of the requesting user. A response RESP is received at E3.

If the response RESP contains an association ASS(user-ID, AAA-ID) comprising at one and the same time the identifier of the requesting user and an identifier of an AAA server of the telecommunications network 1 that has already carried out an authentication of this user, then a step of obtaining an IP address corresponding to the AAA server identifier received is implemented at E4. This may involve for example an interrogation of a server of DNS type. On receipt of the IP address @AAA requested, a request for authentication of the requesting user is dispatched to the address @AAA of the AAA server identified in a step E5. At E6, an authentication successful message is received in return. It is transmitted at E7 to the terminal of the requesting user.

If conversely the response RESP does not contain any association ASS, then an authentication request REQ-AUTH is issued, at E8, destined for a predetermined authentication server, whose address is stored by default by the access management server NAS which implements the authentication management method according to an embodiment of the invention. When a response indicative of a successful authentication REP-AUTH-OK is received at E9, it is transmitted at E10 to the requesting user.

Figure 8:
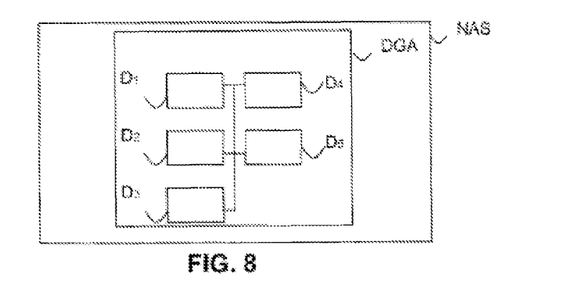
FIG. 8 presents the structure of a device for managing authentication of a user according to an embodiment of the invention.

According to one embodiment of the invention, the method for managing authentication of a user is implemented in an authentication management device DGA, which will now be described in conjunction with FIG. 8. It comprises the material elements that are routinely found in a conventional computer or a specialized router, namely a processor $D_1$, a random-access memory of RAM type $D_2$, a read-only memory of ROM type $D_3$ and means $D_4$ of telecommunication with the network 1.

In accordance with an embodiment of the invention, the device 25 comprises a memory $D_5$ which constitutes a recording support in accordance with an embodiment of the invention. This support stores the computer program in accordance with an embodiment of the invention. This program comprises instructions for the execution of the steps of the method, which has just been described with reference to FIG. 7, for managing authentication of a user in accordance with an embodiment of the invention.

In an advantageous manner the authentication management device according to an embodiment of the invention is implemented in a server NAS for managing access to a service of a user.

Figure 9:
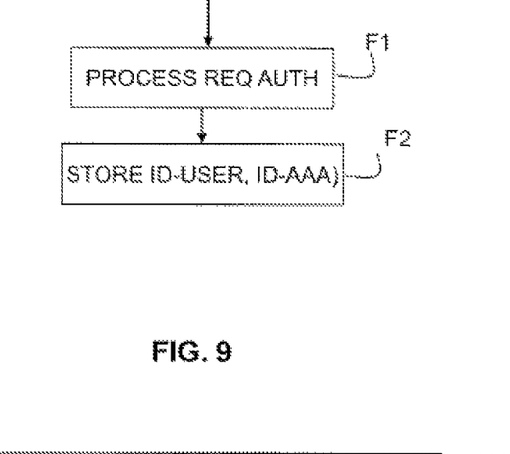
FIG. 9 illustrates in a schematic manner the steps of the method for storing an authentication location for a user according to an embodiment of the invention.

An embodiment of the invention also relates to a method for storing a location of the authentication of a user in the telecommunications network 1, which will now be described in conjunction with FIG. 9. According to an embodiment of the invention, such a method consists, subsequent to a step F1 of successful authentication of the user, in requesting, at F2, the location server ALF 300 for storage of an association ASS(user6ID, AAA-ID) between at least one identifier user-ID of the user UE 10 and an identifier of the AAA authentication server which has performed the authentication.

Figure 10:
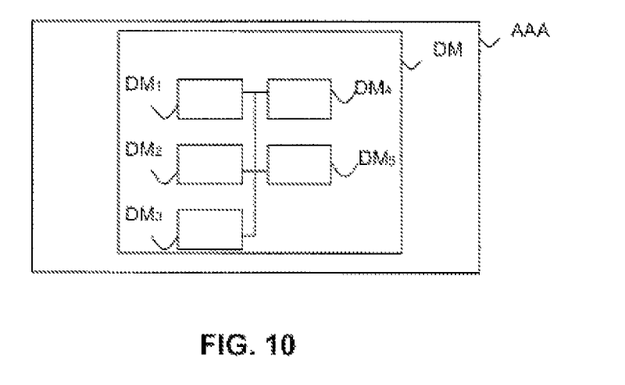
FIG. 10 presents the structure of a device for storing an authentication location for a user according to an embodiment of the invention.

According to one embodiment of the invention, the method for storing an authentication location for a user is implemented in a device DM for storing a location, which will now be described in conjunction with FIG. 10. It comprises the material elements that are routinely found in a conventional computer or a specialized router, namely a processor $DM_1$, a random-access memory of RAM type $DM_2$, a read-only memory of ROM type $DM_3$ and means $DM_4$ of telecommunication with the network 1. Such means of telecommunication comprise in particular an interface with the authentication location server ALF 300, 300' according to an embodiment of the invention.

In accordance with an embodiment of the invention, the device DM comprises a memory $DM_5$ which constitutes a recording support in accordance with an embodiment of the invention. This support stores the computer program in accordance with an embodiment of the invention. This program comprises instructions for the execution of the steps of the method, which has just been described with reference to FIG. 9, for storing an authentication location for a user in accordance with an embodiment of the invention.

In an advantageous manner, such a device is implemented in the AAA authentication server which performed the authentication of the user.

By way of variant, it could be implemented in the server NAS for managing access to the service requested by the user.

Figure 11:
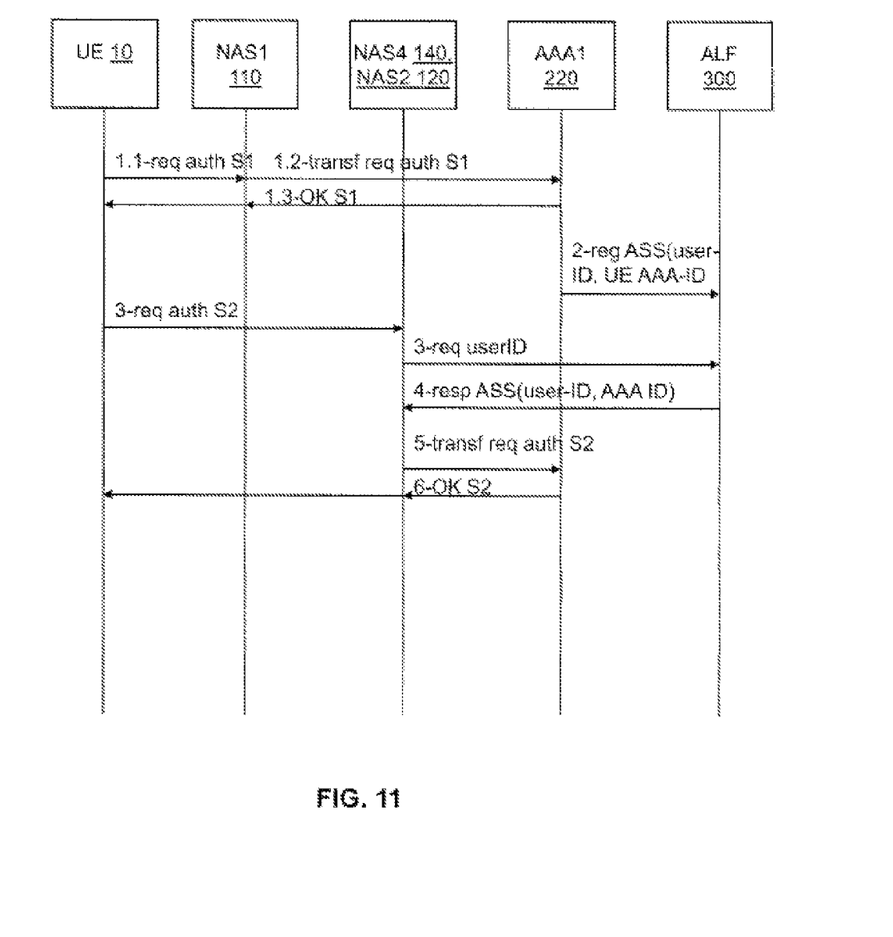
FIG. 11 presents a diagram of streams exchanged between the user desiring to access a service and an AAA authentication architecture in a telecommunications network according to an embodiment of the invention.

An exemplary implementation of the invention will now be described in conjunction with FIG. 11. In this example, it is considered that the terminal UE 10 of the user has authenticated itself a first time successfully with the authentication server AAA1 120 during his request REQ S1 for access to the network 1 via the access network 21. Subsequent to this first authentication, an association ASS between an identifier of this user and an identifier of the authentication server AAA1 involved has been stored by the authentication location server ALF 300. Accordingly, the server AAA1 has sent the location server ALF 300 a storage request comprising said association ASS between the identifier user-ID of the user and the identifier AAA-ID of the authentication server AAA1. By way of example and in a nonlimiting manner, such a message may be in accordance with a protocol of the Diameter or RADIUS type, in which said identifiers are each placed in an existing element of information of AVP (Attribute Value Pair) type for Diameter or Attributes type for RADIUS, or one created specifically to transport them.

In a variant, a specific message of Diameter type "AAA user location registration" is advantageously created for the registration of the association of the identifiers in the server ALF.

It is now considered that the user dispatches a new request for access to a service REQ S2. It is assumed that this request relates to a service offered by the operator on the latter's network 1, for example access to the Internet network 3 or another service, such as a mobility service. It will be noted that it could also again relate to access to the service S1 if the user had moved and consequently had changed access point (intra-access network mobility) or even access network (inter-access network mobility), as presented in conjunction with FIG. 4.

On receipt of a request REQ S2 for access to the service S2, the server NAS 4 140 for managing access to the service S2 seeks to obtain information about a possible first authentication of the user in the network 1. It therefore recovers an identifier of the requesting user with the help of the request received and dispatches an association search request containing the user identifier recovered to the authentication location server ALF 300. The server ALF 300 responds thereto by dispatching the requested association ASS thereto, thus allowing the authentication management server NAS4 to search for the IP address @AAA1 of the authentication server corresponding to the identity AAA-ID received and to dispatch a request for authentication of the user user-ID for the service S2 requested of the server AAA1 identified. As the latter possesses in memory the authentication material used during the first authentication of the user, a simple reauthentication is performed. A message indicative of a successful reauthentication is if appropriate dispatched to the server NAS4, which grants the requesting user access to the service S2.

Of course, other embodiments of the invention may be envisaged.

Although the present disclosure has been described with reference to one or more examples, workers skilled in the art will recognize that changes may be made in form and detail without departing from the scope of the disclosure and/or the appended claims.

The invention claimed is:

1. A method for managing authentication of a user of a telecommunications network, wherein the method comprises the following steps, performed by an access management server of the telecommunications network:
   on receipt by the access management server of a request for access to a service provided by the telecommunications network from a user terminal of said user, sending from the access management server a request for identification of an authentication server to an authentication location server, said request comprising at least one identifier of said user; and
   on receipt by the access management server of a response, from said authentication location server, comprising an identifier of an authentication server that has already authenticated the user associated with said identifier of the user, sending a request for authentication of the user, for accessing the requested service, from the access management server to the authentication server that has already authenticated the user identified using said identifier of the authentication server.

2. The method for managing the authentication of a user as claimed in claim 1, wherein, on receipt of a response not comprising any authentication server identifier associated with the identifier of the user, the method implements the following steps:
   issuing a request for authentication at a predetermined authentication server.

3. A device for managing the authentication of a user of a telecommunications network, wherein the device comprises:
   means for, on receipt of a request for access to a service provided by the network from a user terminal of said user, sending a request for identification of an authentication server to an authentication location server, said request comprising an identifier of said user; and
   means for, on receipt of a response, from said authentication location server, comprising an identifier of an authentication server that has already authenticated the user associated with said identifier of the user, sending a request for authentication of the user, for accessing the requested service, to the authentication server that has already authenticated the user identified using said identifier of the authentication server.

4. A server for managing access to a service provided by an operator of a telecommunications network, wherein the server comprises the device for managing authentication of a user as claimed in claim 3.

5. A telecommunications network, comprising:
   at least one first server which is configured to manage access to at least one service; and
   at least one second server which is configured to manage access to at least one service; and
   at least two authentication servers configured to authenticate a user who requests access from a user terminal of said user to said at least one service for which access is managed by the first and second servers;
   an authentication location server which comprises:
      means for storing an association between an identifier of the user and an identifier of at least one of the first and second authentication server; and
      means for obtaining the association stored in response to a request for access to said at least one service received from the first or second server;
   wherein the first server and the second server each comprises an authentication management device, which comprises:
      means for, on receipt of the request for access to the at least one service from the user terminal, sending a request for identification of an authentication server comprising an identifier of said user, to the authentication location server; and
   means for, on receipt of a response, from said authentication location server, comprising an identifier of an authentication server that has already authenticated the user associated with said identifier of the user, sending a request for authentication of the user for accessing the requested service, to the authentication server that has already authenticated the user identified using said identifier of the authentication server.

6. A computer program product stored on a non-transitory support readable by computer wherein the product comprises program code instructions for execution of a method for managing authentication of a user of a telecommunications network, when the instructions are executed by a computer, wherein the method comprises the following steps:
   on receipt of a request for access to a service provided by the network from a user terminal of said user, sending a request for identification of an authentication server to an authentication location server, said request comprising at least one identifier of said user; and
   on receipt of a response, from said authentication location server, comprising an identifier of an authentication server that has already authenticated the user associated with said identifier of the user, sending a request for authentication of the user to the authentication server that has already authenticated the user identified using said identifier of the authentication server.

7. The method for managing the authentication of a user as claimed in claim 1, wherein said request for identification of an authentication server is a request for identification of an authentication server that has already performed an authentication of said user.

8. The method for managing the authentication of a user as claimed in claim 1, wherein said authentication location server has previously stored an association between said identifier of said user and an identifier of an authentication server that has already performed an authentication of said user.

* * * * *